US012738682B2

(12) United States Patent
He et al.

(10) Patent No.: US 12,738,682 B2
(45) Date of Patent: Sep. 15, 2026

(54) CONNECTOR WITH C-SHAPED ELASTIC PIECE

(71) Applicant: Shenzhen Alex Connector Co Ltd, Shenzhen (CN)

(72) Inventors: Xiling He, Shenzhen (CN); Huilin Wu, Shenzhen (CN); Jijian Wei, Shenzhen (CN); Haiqiu Lu, Shenzhen (CN); Xiao'an Wang, Shenzhen (CN); Xiaobin Wang, Shenzhen (CN); Jun Yang, Shenzhen (CN); Zhaoyang Tang, Shenzhen (CN); Di Jiang, Shenzhen (CN); Mingliang Xia, Shenzhen (CN); Junzhong Liu, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 333 days.

(21) Appl. No.: 18/427,531

(22) Filed: Jan. 30, 2024

(65) Prior Publication Data

US 2025/0233338 A1 Jul. 17, 2025

(30) Foreign Application Priority Data

Jan. 17, 2024 (CN) ........................ 202420120819.0

(51) Int. Cl.
*H01R 13/24* (2006.01)
*H01R 12/71* (2011.01)
*H01R 13/502* (2006.01)

(52) U.S. Cl.
CPC ....... *H01R 13/2464* (2013.01); *H01R 12/716* (2013.01); *H01R 13/502* (2013.01)

(58) Field of Classification Search
CPC .............. H01R 13/2464; H01R 13/502; H01R 13/648; H01R 12/716
(Continued)

(56) References Cited

U.S. PATENT DOCUMENTS 3,587,028 A * 6/1971 Uberbacher ....... H01R 13/6585 439/607.08
7,267,575 B1 9/2007 Hwang
(Continued)

FOREIGN PATENT DOCUMENTS

CN 113224598 A * 8/2021 ........... H01R 13/405
CN 112928550 B * 2/2023 ............. H01R 12/55
(Continued)

*Primary Examiner* — Hae Moon Hyeon

(57) ABSTRACT

The present utility model discloses a connector with a C-shaped elastic piece configured to connect to a printed circuit board (PCB), which comprises: a main housing, wherein two main housings symmetrically spliced are provided; a plurality of groups of wires uniformly distributed along a length direction of the main housing, wherein any one group of wires comprise a signal wire and a ground wire; a plurality of elastic pieces separately welded with the signal wire of the wires, wherein each elastic piece comprises a welding part welded with the signal wire and an abutting part abutted against the PCB; a spacer assembly comprising a plurality of separation spaces for separating adjacent elastic pieces; and an isolation frame provided with a plurality of slots for the elastic pieces to pass through, wherein the elastic pieces pass through the isolation frame and are abutted against the PCB.

9 Claims, 4 Drawing Sheets

(58) Field of Classification Search
USPC .............................. 439/78, 101, 108, 607.08
See application file for complete search history.

(56) References Cited

U.S. PATENT DOCUMENTS

| | | | | |
|---|---|---|---|---|
| 7,553,187 | B2 * | 6/2009 | Feldman | H01R 13/506 439/607.17 |
| 7,997,933 | B2 * | 8/2011 | Feldman | H01R 13/6583 439/607.05 |
| 10,367,280 | B2 * | 7/2019 | Lloyd | H01R 12/75 |
| 10,958,016 | B2 | 3/2021 | Yang et al. | |
| 11,355,875 | B2 | 6/2022 | Wang et al. | |
| 2009/0305533 | A1 * | 12/2009 | Feldman | H01R 13/65918 439/101 |
| 2014/0220820 | A1 * | 8/2014 | Mongold | H05K 1/0218 439/607.08 |
| 2020/0006898 | A1 | 1/2020 | Yang et al. | |
| 2020/0321727 | A1 | 10/2020 | Li et al. | |
| 2021/0091491 | A1 | 3/2021 | Wang et al. | |
| 2024/0088594 | A1 * | 3/2024 | Feng | H01R 12/714 |

FOREIGN PATENT DOCUMENTS

| | | | | |
|---|---|---|---|---|
| CN | 116885474 | A * | 10/2023 | H01R 12/57 |
| CN | 116960695 | A * | 10/2023 | H01R 13/6581 |

* cited by examiner

CONNECTOR WITH C-SHAPED ELASTIC PIECE

CROSS REFERENCE TO RELATED APPLICATION

This application claims priority benefit of Chinese patent Application No. 202420120819.0, filed on Jan. 17, 2024, and the entire contents of which are incorporated herein by reference.

TECHNICAL FIELD

The present utility model relates to the technical field of connectors, and in particular to a connector with a C-shaped elastic piece.

BACKGROUND

A connector is a common component that is used for bridging communication between blocked or isolated circuits in a circuitry, so as to allow a current to flow therethrough and enable the circuitry to realize a predetermined function. The connector is an indispensable component in an electronic device, and there are various types of connectors depending on the application object, frequency, power, application environment, and the like.

An elastic piece of the existing connector is mostly in an O-shaped structure, the O-shaped elastic piece forms a closed loop through over-pressure, which makes the characteristic impedance very unstable, when the elastic piece is closed into an O shape, the contact points are different in position due to uneven stress caused by structural tolerance, and the contact points can slide through over-pressure stress, which is a fatal defect for the high-frequency connector.

SUMMARY

A primary objective of the present utility model is to provide a connector with a C-shaped elastic piece, which aims to improve poor consistency of characteristic impedance of a connector caused by the O-shaped elastic piece structure of the connector.

In order to achieve the objective, the present utility model provides a connector with a C-shaped elastic piece configured to connect to a printed circuit board (PCB) and comprising:

- a main housing, wherein two main housings symmetrically spliced are provided;
- a plurality of groups of wires uniformly distributed along a length direction of the main housing, wherein any one group of wires comprise a signal wire and a ground wire;

a plurality of elastic pieces separately welded with the signal wire of the wires, wherein each elastic piece comprises a welding part welded with the signal wire and an abutting part abutted against the PCB, the abutting part is arranged in a C shape, a thickness of the welding part is set to be 0.05 mm, and a thickness of the abutting part is set to be 0.12 mm;

- a spacer assembly comprising a plurality of separation spaces for separating adjacent elastic pieces; and an isolation frame provided with a plurality of slots for the elastic pieces to pass through, wherein the elastic pieces pass through the isolation frame and are abutted against the PCB.

Optionally, the wire is provided as a wire in model American wire gauge 30 (30 AWG).

Optionally, the elastic piece is provided as a copper sheet.

Optionally, the spacer assembly comprises a plurality of first spacers mounted between two adjacent wires, a second spacer mounted along a length direction of the main housing, the first spacer is connected to the ground wire of the wire, a side surface of the second spacer is abutted against the first spacer, and a plurality of [-shaped separation spaces for accommodating the wire and the elastic piece are formed between the second spacer and the plurality of first spacers.

Optionally, the first spacer and the second spacer are both provided as copper sheets.

Optionally, two positioning lugs are symmetrically arranged at two ends of the second spacer, and the main housing is provided with positioning and clamping holes for clamping with the positioning lugs.

Optionally, the isolation frame is a plastic isolation frame, the isolation frame is docked with the main housing, the isolation frame is provided with a mounting clamping groove, and the main housing is provided with a mounting clamping platform correspondingly clamped to the mounting clamping groove.

Optionally, the elastic piece passes through the slot of the isolation frame and extends to 0.3 mm outside the isolation frame.

Optionally, the main housing is provided as a plastic housing.

Optionally, any one of the main housings is provided with a positioning post and a positioning hole for being spliced with another main housing.

The present utility model has the beneficial effects that: a structure of the existing connector has been improved, the conventional O-shaped elastic piece is designed as a C-shaped elastic piece, compared with the structure of the O-shaped elastic piece, there is no need to implement signal transmission after closed loop, which improves the consistency and stability of the characteristic impedance of the connector, and the signal flows from one end of the C-shaped elastic piece to the other end along a path for transmission without the need for shunting, so that the C-shaped elastic piece has a better crosstalk effect and a simple structure, and occupies little space, allowing the connector to be smaller in size.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
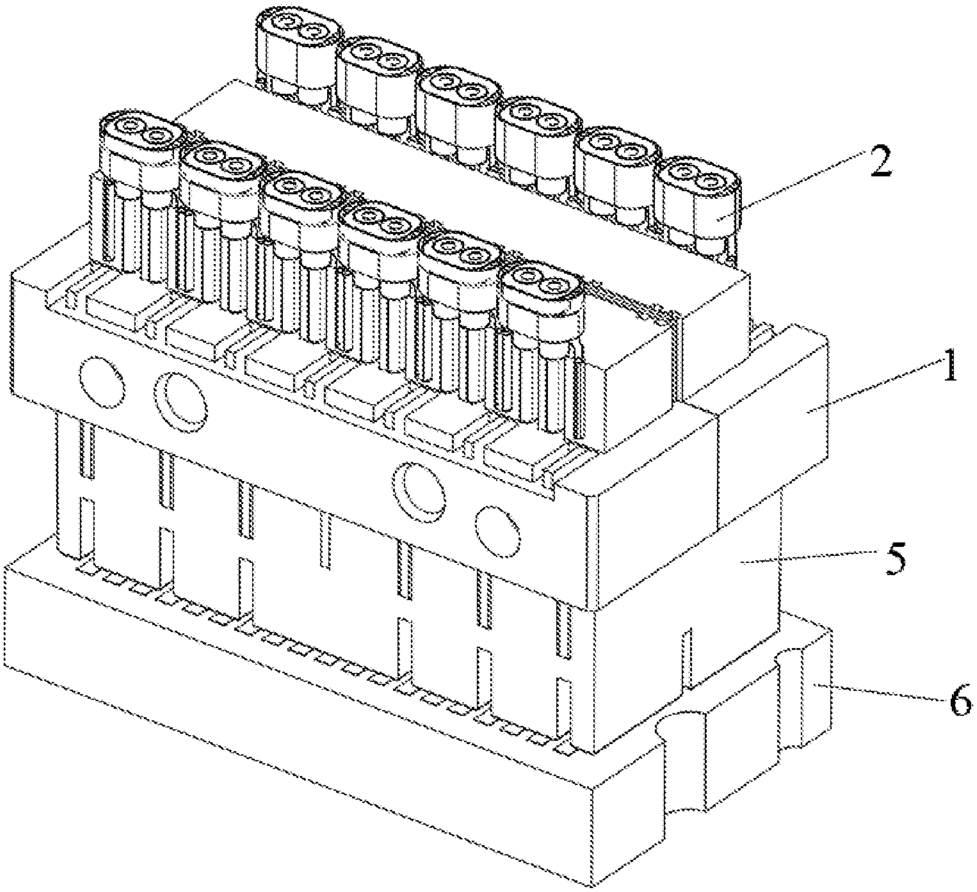
FIG. 1 is a schematic diagram of an overall structure of a connector according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

It should be noted that, the elastic piece of the existing connector uses an O-shaped structure, when in use, the O-shaped elastic piece is stressed and deformed by abutting against the PCB to form a closed O-shape for signal transmission; in the process of pressing, due to the influence of factors such as structural tolerance, the stress of the O-shaped elastic piece is uneven, the closed positions of the O-shaped elastic piece are different, and a regular O-shape cannot be completely formed, consequently, the characteristic impedance stability of the connector is poor; moreover, during the signal transmission process, the signal flows from one end of the O-shaped elastic piece to the other end of the O-shaped elastic piece in two paths, then merges and is transmitted, and the signal transmission paths are dispersed, which causes serious interference and incapability of passing crosstalk in the signal transmission process; and the O-shaped elastic piece has a large size and occupies a large space, which affects the size of the connector.

Figure 2:
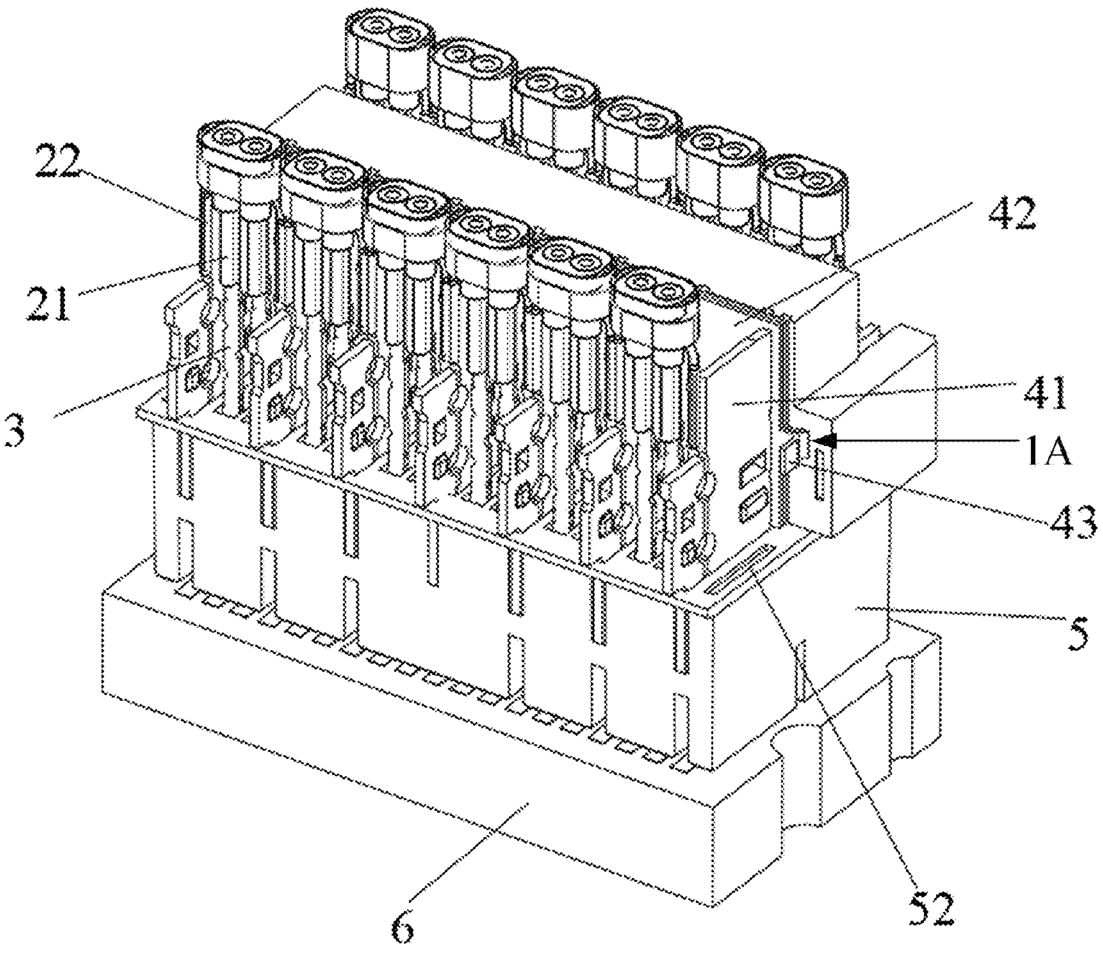
FIG. 2 is a schematic diagram of a structure of a connector according to the present utility model with a main housing hidden.
Figure 3:
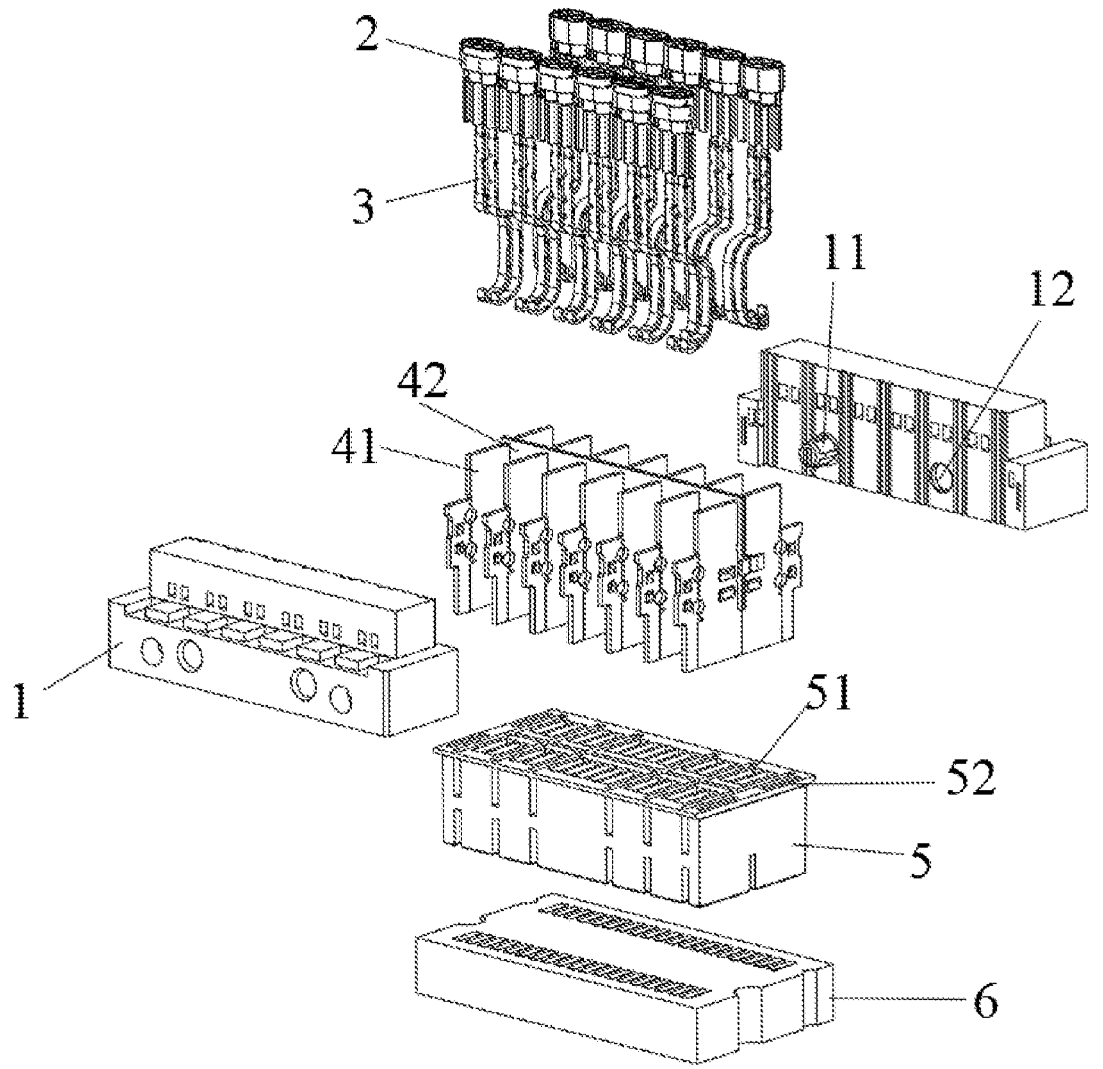
FIG. 3 is an exploded view of an overall structure of a connector according to the present utility model.
Figure 4:
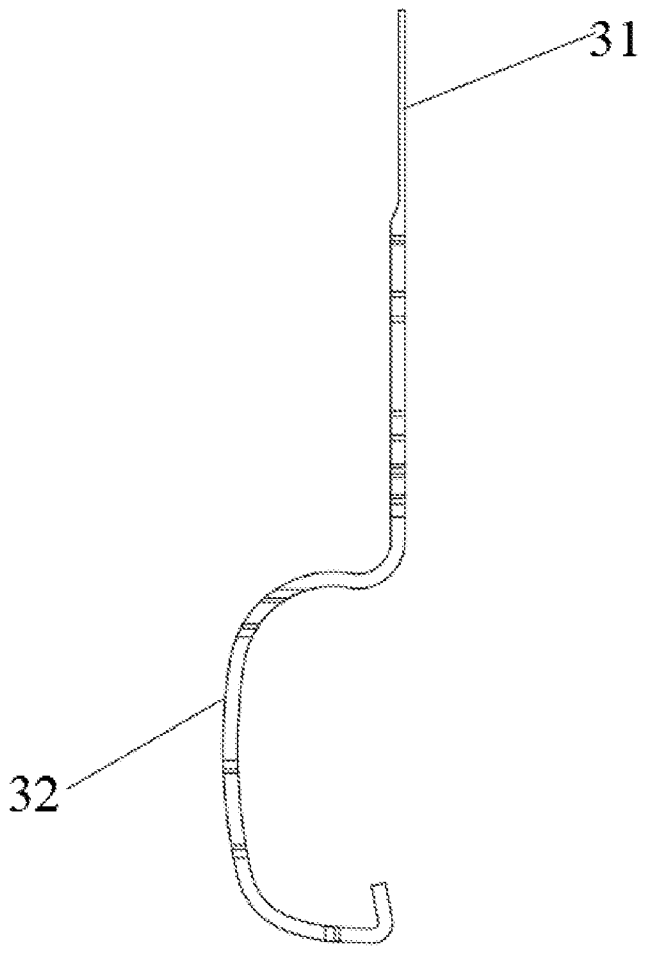
FIG. 4 is a side view of an elastic piece according to the present utility model.

Therefore, an embodiment of the present utility model provides a connector with a C-shaped elastic piece configured to connect to a PCB 6. Referring to FIGS. 1 to 4, the connector comprises:

- a main housing 1, wherein two main housings 1 symmetrically spliced are provided;
- a plurality of groups of wires 2 uniformly distributed along a length direction of the main housing 1, wherein any one group of wires 2 comprise a signal wire 21 and a ground wire 22;
- a plurality of elastic pieces 3 separately welded with the signal wire 21 of the wires 2, wherein each elastic piece 3 comprises a welding part 31 welded with the signal wire 21 and an abutting part 32 abutted against the PCB 6, the abutting part 32 is arranged in a C shape, a thickness of the welding part 31 is set to be 0.05 mm, and a thickness of the abutting part 32 is set to be 0.12 mm;
- a spacer assembly comprising a plurality of separation spaces for separating adjacent elastic pieces 3; and
- an isolation frame 5 provided with a plurality of slots 51 for the elastic pieces 3 to pass through, wherein the elastic pieces 3 pass through the isolation frame 5 and are abutted against the PCB 6.

It should be noted that, in this embodiment, the conventional O-shaped elastic piece 3 is designed as a C-shaped elastic piece 3, compared with the structure of the O-shaped elastic piece 3, there is no need to implement signal transmission after closed loop, which improves the consistency and stability of the characteristic impedance of the connector, and the signal flows from one end of the C-shaped elastic piece 3 to the other end along a path for transmission without the need for shunting, so that the C-shaped elastic piece has a better crosstalk effect and a simple structure, and occupies little space, allowing the connector to be smaller in size.

Specifically, in this embodiment, the elastic piece 3 is connected to the signal wire 21 of the wire 2 by welding, a thickness of the welding part 31 of the elastic piece 3 is set to be 0.05 mm, and the wire 2 is provided as a wire in model American wire gauge 30 (30 AWG) with a wire diameter of 0.254 mm; the characteristic impedance of the elastic piece 3 is determined by a cross-sectional area thereof, a width of the elastic piece affects near-far crosstalk, and the narrower the elastic piece is actually, the better the characteristic impedance is, because under the condition of pitch=0.6, when signals are transmitted, the farther the distance between the two terminals is, the better the effect is; however, under the condition that a width of the wire 2 at the welding position is determined to be 0.254 mm, the width of the welding part 31 of the elastic piece 3 is more than or equal to 0.254, so that the welding is reliable, therefore, a pad with the width of 0.3 mm is most suitable, the thickness of the elastic piece 3 affects the elastic force of the elastic piece 3, and the thickness of 0.12 mm is most suitable through simulation. Since the entire cross-sectional area of the welding part 31 is increased after the signal wire 21 is welded, the cross-sectional area of the welding part 31 of the elastic piece 3 can be made close to a cross-sectional area of the other positions by reducing the thickness of the welding part 31 of the elastic piece 3.

Further, the elastic piece 3 is provided as a copper sheet, so that the elasticity and the strength of the elastic piece 3 are ensured, and the impedance and the stability of the near-far crosstalk performance are also matched.

Further, the spacer assembly comprises a plurality of first spacers 41 mounted between two adjacent wires 2, a second spacer 42 mounted along a length direction of the main housing 1, the first spacer 41 is connected to the ground wire 22 of the wire 2, a side surface of the second spacer 42 is abutted against the first spacer 41, and a plurality of [-shaped separation spaces for accommodating the wire 2 and the elastic piece 3 are formed between the second spacer 42 and the plurality of first spacers 41. Each group of signal wires 21 and the elastic piece 3 are separately wrapped in an independent [-shaped separation space, the first spacer 41 is connected to the ground wire 22 of the wire 2, and when the connector is used, the [-shaped separation space can effectively isolate the signal wires 21 and the elastic piece 3 inside, prevent the interference of signals between the adjacent signal wires 21 and improve the use performance of the connector.

Further, the first spacer 41 and the second spacer 42 are both provided as copper sheets, so that interference resistance between signals is further improved.

Further, two positioning lugs 43 are symmetrically arranged at two ends of the second spacer 42, and the main housing 1 is provided with positioning and clamping holes 1A for clamping with the positioning lugs 43 to effectively position the mounting of the second spacer 42 and facilitate the fixation of the second spacer on the main housing 1.

Further, the isolation frame 5 is a plastic isolation frame 5, the isolation frame 5 is docked with the main housing 1, the isolation frame 5 is provided with a mounting clamping groove 52, and the main housing 1 is provided with a mounting clamping platform correspondingly clamped to the mounting clamping groove 52. In this embodiment, the isolation frame 5 is made of liquid crystal polymer (LCP) plastic material with a dielectric constant of 6.0, the isolation frame 5 guides the elastic pieces 3 by the formed slots 51, so that each elastic piece 3 can be deformed uniformly in the direction of the slots 51 to ensure consistency, and the isolation frame 5 is connected to a clamping structure of the mounting clamping platform by mounting the mounting clamping groove 52, which can improve the convenience of assembly.

Further, the elastic piece 3 passes through the slot 51 of the isolation frame 5 and extends to 0.3 mm outside the isolation frame 5, so that a certain deformation allowance is reserved for the elastic piece 3, and the elastic piece 3 and the PCB 6 can be conveniently and effectively contacted.

Further, the main housing 1 is provided as a plastic housing to ensure the insulation of the connector housing and improve the safety of use.

Optionally, any one of the main housings 1 is provided with a positioning post 11 and a positioning hole 12 for being spliced with another main housing 1, and the two main housings 1 are clamped correspondingly through the positioning post 11 and the positioning hole 12 to facilitate assembly.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

The invention claimed is:

1. A connector with a C-shaped elastic piece configured to connect to a printed circuit board (PCB), comprising:

a main housing, wherein two main housings symmetrically spliced are provided;

a plurality of groups of wires uniformly distributed along a length direction of the main housing, wherein any one group of wires comprise a signal wire and a ground wire;

a plurality of elastic pieces separately welded with the signal wire of the wires, wherein each elastic piece comprises a welding part welded with the signal wire and an abutting part abutted against the PCB, the abutting part is arranged in a C shape, a thickness of the welding part is set to be 0.05 mm, and a thickness of the abutting part is set to be 0.12 mm;

a spacer assembly, clamped to the main housing and comprising a plurality of separation spaces for separating adjacent elastic pieces; and an isolation frame, clamped to the main housing and provided with a plurality of slots for the elastic pieces to pass through, wherein the elastic pieces pass through the isolation frame and are abutted against the PCB;

wherein the spacer assembly comprises a plurality of first spacers mounted between two adjacent wires, a second spacer mounted along a length direction of the main housing, the first spacer is connected to the ground wire of the wires, a side surface of the second spacer is abutted against the first spacer, and a plurality of [-shaped separation spaces for accommodating the wires and the elastic piece are formed between the second spacer and the plurality of first spacers.

2. The connector with a C-shaped elastic piece according to claim 1, wherein the first spacer and the second spacer are both provided as copper sheets.

3. The connector with a C-shaped elastic piece according to claim 1, wherein two positioning lugs are symmetrically arranged at two ends of the second spacer, and the main housing is provided with positioning and clamping holes for clamping with the positioning lugs.

4. The connector with a C-shaped elastic piece according to claim 1, wherein the isolation frame is a plastic isolation frame, the isolation frame is docked with the main housing, and the isolation frame is provided with a mounting clamping groove.

5. The connector with a C-shaped elastic piece according to claim 1, wherein the elastic piece passes through the slot of the isolation frame and extends to 0.3 mm outside the isolation frame.

6. The connector with a C-shaped elastic piece according to claim 1, wherein the wire is provided as a wire in model American wire gauge 30 (30 AWG).

7. The connector with a C-shaped elastic piece according to claim 1, wherein the elastic piece is provided as a copper sheet.

8. The connector with a C-shaped elastic piece according to claim 1, wherein the main housing is provided as a plastic housing.

9. The connector with a C-shaped elastic piece according to claim 1, wherein any one of the main housings is provided with a positioning post and a positioning hole for being spliced with another main housing.

* * * * *